(12) United States Patent
Hakenholt et al.

(10) Patent No.: US 9,593,703 B2
(45) Date of Patent: Mar. 14, 2017

(54) EXPANSION ANCHOR

(71) Applicant: Hilti Aktiengesellschaft, Schaan (LI)

(72) Inventors: Christoph Hakenholt, Feldkirch (AT);
Joerg Appl, Buchs (CH)

(73) Assignee: Hilti Aktiengesellschaft, Schaan (LI)

( * ) Notice: Subject to any disclaimer, the term of this patent is extended or adjusted under 35 U.S.C. 154(b) by 117 days.

(21) Appl. No.: 14/371,697

(22) PCT Filed: Dec. 5, 2012

(86) PCT No.: PCT/EP2012/074475
§ 371 (c)(1),
(2) Date: Jul. 10, 2014

(87) PCT Pub. No.: WO2013/104465
PCT Pub. Date: Jul. 18, 2013

(65) Prior Publication Data
US 2015/0167715 A1  Jun. 18, 2015

(30) Foreign Application Priority Data

Jan. 13, 2012  (DE) ........................ 10 2012 200 462

(51) Int. Cl.
*F16B 13/08* (2006.01)
*F16B 13/06* (2006.01)
(Continued)

(52) U.S. Cl.
CPC .......... *F16B 13/0858* (2013.01); *E21B 23/00* (2013.01); *E21B 23/01* (2013.01);
(Continued)

(58) Field of Classification Search
CPC ........ E21B 23/01; E21B 23/00; F16B 13/065; F16B 13/0858; F16B 13/003; F16B 13/002;
(Continued)

(56) References Cited

U.S. PATENT DOCUMENTS

2004/0096288 A1   5/2004   Haug et al.
2008/0008553 A1   1/2008   Gillis et al.
(Continued)

FOREIGN PATENT DOCUMENTS

CN   1502015 A    6/2004
CN   2823636 Y   10/2006
(Continued)

OTHER PUBLICATIONS

Chinese Office Action dated May 5, 2015, with English translation (Nine (9) pages).
PCT/EP2012/074475, International Search Report dated Feb. 5, 2013 (Two (2) pages).
German Search Report dated Nov. 13, 2012, with Statement of Relevancy (Six (6) pages).

*Primary Examiner* — Yong-Suk (Philip) Ro
(74) *Attorney, Agent, or Firm* — Crowell & Moring LLP

(57) ABSTRACT

An expansion anchor, in particular for mineral construction materials, for example, concrete, is disclosed. A generic expansion anchor is equipped with an expansion sleeve for anchoring on a borehole wall and with an anchor bolt, which is disposed through the expansion sleeve, where the anchor bolt has an expansion region for expansion of the expansion sleeve. The anchor bolt has a cutting thread for cutting a thread into the borehole wall. A respective setting tool and setting method are also disclosed.

14 Claims, 1 Drawing Sheet

(51) Int. Cl.
 E21B 23/00 (2006.01)
 E21B 23/01 (2006.01)
 F16B 13/00 (2006.01)
 F16B 25/00 (2006.01)

(52) U.S. Cl.
 CPC .......... F16B 13/003 (2013.01); F16B 13/065 (2013.01); *F16B 13/002* (2013.01); *F16B 25/0026* (2013.01)

(58) Field of Classification Search
 CPC .... F16B 25/0026; F16B 13/025; F16B 13/13; Y10T 29/49948; Y10T 29/49947; Y10T 29/49963; Y10T 29/5343; Y10T 29/49835; Y10T 29/49833
 See application file for complete search history.

(56) References Cited

U.S. PATENT DOCUMENTS

| | | |
|---|---|---|
| 2009/0092458 A1 | 4/2009 | Moroney et al. |
| 2010/0316465 A1 | 12/2010 | Gillis et al. |

FOREIGN PATENT DOCUMENTS

| | | |
|---|---|---|
| CN | 103314157 A | 9/2013 |
| DE | 41 16 149 A1 | 11/1992 |
| DE | 101 18 374 A1 | 10/2002 |
| DE | 10 2009 045 478 A1 | 4/2011 |
| EP | 0 559 381 A1 | 9/1993 |
| EP | 1 072 802 A1 | 1/2001 |
| GB | 2 254 392 A | 10/1992 |

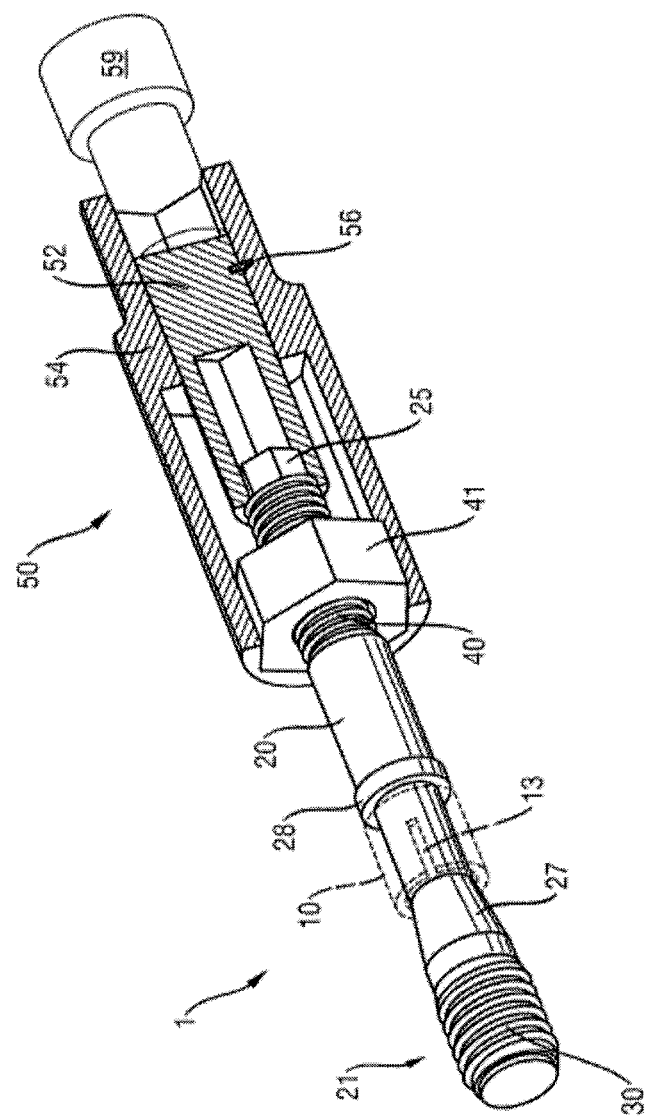

EXPANSION ANCHOR

This application claims the priority of International Application No. PCT/EP2012/074475, filed Dec. 5, 2012, and German Patent Document No. 10 2012 200 462.9, filed Jan. 13, 2012, the disclosures of which are expressly incorporated by reference herein.

BACKGROUND AND SUMMARY OF THE INVENTION

The invention relates to an expansion anchor, in particular for mineral construction materials such as concrete, as well as a respective setting tool and a setting method. A generic expansion anchor is equipped with an expansion sleeve for anchoring it on a borehole wall and with an anchor bolt, which passes through the expansion sleeve, so that the anchor bolt has an expansion region for expansion of the expansion sleeve.

A generic torque-controlled expansion anchor is known from DE 41 16 149 A1. According to the prior art, in order to set such an expansion anchor, a borehole is created and then the anchor is driven in using a hammer. Finally, the nut disposed on the expansion anchor is tightened with a wrench, for example, tightening the expansion region into the expansion sleeve and thereby causing the expansion sleeve to expand. It is usually possible to conclude from reaching the target torque on the nut that the target expansion of the expansion sleeve has been reached and therefore the desired pull-out resistance has been achieved.

However, the setting process may be relatively complex because it usually requires three different tools, namely a drill, a hammer and a wrench.

The object of the present invention is to provide an expansion anchor, a respective setting tool and a setting method, which will allow a particularly simple setting process with little effort and with a high reliability.

An expansion anchor according to the invention is characterized in that the anchor bolt has a cutting thread for cutting into the borehole wall.

A first basic idea of the invention may be regarded as providing a cutting thread on the anchor bolt of the expansion anchor, so that the cutting thread can cut into the cylindrical borehole wall in the substratum. The cutting thread is thus capable of pulling the anchor bolt into the borehole as the anchor bolt is turned. The anchor can thus automatically screw itself into the substratum with a rotational movement of the anchor bolt relative to the substratum. According to the invention, the anchor can thus be driven into the borehole; according to the prior art, axially directed forces, in particular hammer blows, would have usually been necessary to accomplish this according to the prior art, but now it can be achieved by a rotational movement. The setting operation can be simplified further substantially in this way because both the creation of the borehole, which precedes the driving of the anchor bolt, and the subsequent tightening of the expansion anchor nut after the anchor bolt has been driven into the borehole also include rotational movements. The tools used to create these rotational movements can then potentially also be used for driving the anchor into the borehole. In addition, the invention can simplify the setting of the expansion anchor in regions that are difficult to reach in which hammer strikes cannot readily be created.

Preferably the cutting thread does not assume any significant carrying load, i.e., the carrying load is still applied primarily by the expansion sleeve which is spread following the screwing of the anchor bolt into the borehole by axial tightening of the expansion region with the cylindrical borehole wall. In this case, relatively low requirements are made of the cutting thread, so that low manufacturing costs can be achieved with high extraction strengths at the same time.

In order for the cutting thread to be able to cut into the surrounding material, the cutting thread expediently has, in at least some regions, a surface hardness that is greater than the surface hardness of the borehole wall. The cutting thread may therefore also have cutting bodies, which increase the hardness selectively.

The expansion sleeve and/or the anchor bolt is/are preferably made of a metal material. In order for the expansion region of the anchor bolt to be able to spread the expansion sleeve, the anchor bolt tapers in the expansion region toward the end of the anchor bolt facing away from the borehole, in particular the end on the outside of the borehole, i.e., the cross section of the anchor bolt increases with an increase in distance from the end facing away from the borehole. The expansion region may in particular have at least one conical section. The expansion region is provided for expansion of the expansion sleeve in axial tightening of the expansion region into the expansion sleeve, such that the axial tightening may also contain a rotational component of the anchor bolt relative to the expansion sleeve, for example, when the cutting thread is unscrewed back out of the substratum for expansion of the expansion sleeve.

In particular for easier expansion of the expansion sleeve and/or for simpler manufacturing, the expansion sleeve may have one or more slots, which may extend in the axial direction in particular. According to the invention, the axial direction may be understood to be a direction in which the longitudinal axis of the anchor bolt and/or the expansion sleeve is extended. The expansion sleeve may have protrusions on its outside for an even better attachment to the borehole wall.

According to the invention, the anchor bolt has a screw thread in a known way. This screw thread, which can run expediently outside of the borehole in at least some regions, can serve to introduce the operating loads into the anchor bolt and thus into the substratum. The cutting thread according to the invention may in particular be different from the screw thread according to the invention.

It is also preferable that a nut is provided on the screw thread. This nut, which has an inside thread corresponding to the screw thread, may be regarded as a component of the expansion anchor according to the invention. It may serve to fasten a payload to the anchor bolt, for example.

It is especially preferable that the cutting thread is disposed with an axial offset to the screw thread on the anchor bolt. Since the cutting thread and the screw thread have different functions, they may also make different requirements of their production. Particularly simple production is made possible because of the preferred spatial separation of the two threads. It is possible in particular to provide for the anchor bolt to have a cutting thread with a greater surface hardness than the screw thread.

In addition, it is expedient that the cutting thread is disposed in at least some regions on a side of the expansion sleeve on the anchor bolt facing away from the screw thread and/or for the cutting thread to be disposed in at least some regions on a side of the expansion region on the anchor bolt facing away from the screw thread. According to this embodiment variant, the cutting thread runs ahead of the expansion sleeve and/or the expansion region, when the anchor is driven into the borehole. This can ensure that the cutting thread is already gripping securely in the borehole wall when the expansion sleeve enters into the borehole, thus causing relatively high friction on the borehole wall. Driving the anchor into the borehole can thus be further simplified.

It is especially preferred that the cutting thread has the same direction of rotation as the screw thread. It is possible in this case to provide that the anchor bolt is to be driven into the borehole with a corotational nut in a first direction of rotation and then the nut is secured in a rotationally fixed manner for expansion of the expansion sleeve and for the anchor bolt to be moved in the opposite direction of rotation. The rotation of the anchor bolt relative to the nut in the reverse direction of rotation has the effect that the anchor bolt moves axially to the rear relative to the nut and thus moves out of the borehole while the nut remains stationary axially. The change in the direction of rotation between the driving operation and the expansion operation prevents an excessive load from developing in the region of the cutting thread. In addition, it is advantageous that the cutting thread and the screw thread have the same pitch, which can further reduce the load in expansion.

The cutting thread should preferably not stand in the way of the expansion operation, which includes an axial movement of the expansion region and thus the anchor bolt relative to the borehole. It is therefore possible to provide, for example, that the cutting thread is configured so that it is sheared off from the anchor bolt during the expansion operation.

In particular the cutting thread may be disposed at the tip of the anchor bolt. This may be advantageous, for example, with regard to the use of material. The configuration of the cutting thread at the tip may include in particular the fact that its axial distance from the more proximal end of the anchor bolt amounts to at most the height of pitch of the cutting thread, in particular at most half or at most one-fourth of the pitch of the cutting thread.

Another advantageous embodiment lies in the fact that the anchor bolt has a turn handle to which a driveshaft can be connected in a form-fitting manner for transfer of the torque to the anchor bolt. Such a turn handle makes it possible in a particularly simple and reliable manner to apply to the anchor bolt the torque necessary to drive the anchor bolt, i.e., for cutting the cutting thread in the borehole wall.

The turn handle is preferably disposed on one end, in particular on the front end on the anchor bolt, in particular on the end opposite the cutting thread and/or the expansion sleeve, preferably on the end facing away from the borehole. The turn handle is especially readily accessible in this way, which thus simplifies the second operation.

In addition, it is advantageous that the turn handle has a polygonal shape, in particular a polygonal head, for example, a hexagonal head. It is especially simple to attach a tool to a polygonal head disposed on the anchor bolt.

For example, it is possible to provide that the expansion anchor is driven into the borehole by means of a tangential impact wrench, which is preferably attached directly or indirectly to the turn handle. Such a tangential impact wrench permits particularly efficient tightening of the anchor in concrete.

The invention also relates to a setting tool for an expansion anchor according to the invention, having a driving socket that can be connected to the anchor bolt in a rotationally fixed manner and having a tightening socket that can be connected to the nut in a rotationally fixed manner. By means of the driving socket, the anchor bolt can be set in rotation to drive the anchor into the borehole. By means of the tightening socket, the nut can be secured relative to the rotating anchor bolt and/or the nut can be made to rotate to expand the expansion sleeve.

It is preferable in particular for the driving socket to be disposed coaxially with the tightening socket and/or at least partially in the interior of the tightening socket. A particularly compact configuration can be obtained in this way.

In addition, it is advantageous that the setting tool has a switchable coupling for switchable transfer of torque between the driving socket and the tightening socket. According to this embodiment, the two sockets are connected in a rotationally fixed manner, such that this coupling, however, can be released as needed. Thus, only a single drive motor is required to drive the two sockets and to drive the anchor, and the subsequent tightening of the nut can be performed without a tool change. In particular it is possible to provide that the two sockets are coupled in a rotationally fixed manner while the anchor is being driven into the borehole, so that during this operation, the nut remains stationary relative to the anchor bolt and the rotationally fixed coupling is canceled for tightening the nut and/or expansion of the expansion sleeve, so that the nut can be offset relative to the anchor bolt. The switchable coupling may have a stop, for example.

Furthermore, it is preferable for the driving socket to be axially displaceable relative to the tightening socket. This embodiment takes into account the fact that in expansion of the expansion sleeve and/or in tightening of the nut, the nut moves axially relative to the anchor bolt. The axial displacement of the two sockets relative to one another can cancel this movement and can thus ensure a particularly reliable transfer or torque.

The setting tool preferably has a tangential impact wrench which is connected to the driving socket and/or the tightening socket in a rotationally fixed manner. A tangential impact wrench permits a particularly efficient method of driving the anchor. In particular the driving socket or the tightening socket may comprise a polygonal socket, in particular a square socket, to which the tangential impact wrench is releasably attached. The tangential impact wrench may also be fixedly connected to the driving socket and/or the tightening socket.

The invention also relates to a method for setting an expansion anchor according to the invention, in particular with a setting tool according to the invention, with which the anchor bolt is driven into a borehole while rotating, such that the cutting thread cuts into the borehole wall and the anchor bolt is then moved a distance out of the borehole again, such that the expansion region is pulled into the expansion sleeve and causes the expansion sleeve to expand. When the anchor bolt is moved out of the borehole, the expansion sleeve remains in the borehole because of the frictional connection and/or form-fitting connection to the wall of the borehole so that there is a relative axial movement between the anchor bolt and the expansion sleeve in which the expansion region reaches the expansion sleeve and causes the expansion sleeve to expand.

It is particularly preferred that the anchor bolt is driven into the borehole with rotation in a first direction of rotation, for example, clockwise and then the direction of rotation of the anchor bolt is reversed for example, to counterclockwise, so that the anchor bolt again moves a distance out of the borehole. Before reversing the direction of rotation, the nut can be secured in a rotationally fixed position, so that the rotation of the anchor bolt relative to the nut leads to an axial movement of the anchor bolt relative to the nut.

Furthermore, the invention relates to a fastening configuration with a structural body in which a borehole is disposed such that an expansion anchor according to the invention is disposed in the borehole. The structural body may comprise in particular a mineral material, for example, concrete.

The invention is explained in greater detail below on the basis of preferred exemplary embodiments which are diagrammed schematically in the accompanying FIGURE.

BRIEF DESCRIPTION OF THE DRAWING

FIG. 1 is a partial sectional perspective diagram of an expansion anchor according to the invention with a setting tool according to the invention.

DETAILED DESCRIPTION OF THE DRAWING

FIG. 1 shows one example of an expansion anchor 1 according to the invention. The expansion anchor 1 has an anchor bolt 20 and an expansion sleeve 10, which is shown with a dotted line and surrounds the anchor bolt 20. The expansion sleeve 10 may be provided with slots 13 running axially to facilitate expansion.

On the rear end of the anchor bolt 20, a screw thread 40, which is formed as an external thread is provided on the anchor bolt 20. A nut 41 with a corresponding internal thread is disposed on this screw thread 40.

For expansion of the expansion sleeve 10 the anchor bolt 20 has an expansion region 27 on the side of the expansion sleeve 10 facing away from the screw thread 40. In this expansion region 27, the cross section of the anchor bolt 20 tapers toward the expansion sleeve 10, i.e., toward the screw thread 40. In the exemplary embodiment shown here, the expansion sleeve is designed in the form a cylinder jacket and the expansion region 27 is designed to be conical.

On the side of the expansion sleeve 10 facing the screw thread 40, the anchor bolt 20 has a stop 28 which is in the form of an annular stop, for example, which limits the axial displacement of the expansion sleeve 10 toward the screw thread 40, in particular while driving the expansion anchor 1 into a borehole.

In addition to the screw thread 40, a cutting thread 30 which is provided on the anchor bolt 20 can cut into the wall of the borehole for driving the expansion anchor 1 into the borehole. The diameter of the anchor bolt 20 is therefore greatest at the cutting thread 30. The cutting thread 30 may be hardened and/or may comprise additional cutting bodies made of a hard metal. The cutting thread 30 is spaced a distance away from the screw thread 40 axially, i.e., in the longitudinal direction of the anchor bolt 20. The cutting thread is situated on the side of the expansion sleeve 10 facing away from the screw thread 40 and on the side of the stop 28 facing away from the screw thread 40 at the tip 21 of the anchor 1.

On its end facing away from the tip 21, the anchor bolt 20 has a turn handle 25, which is designed as a hexagonal head in the exemplary embodiment shown here. A driveshaft, for example, the driving socket 52 of a setting tool, can be connected in a rotationally fixed manner to this turn handle 25.

FIG. 1 also shows an example of a setting tool 50 according to the invention for an expansion anchor 1 according to the invention. The setting tool 50 has a tangential impact wrench 59, which is shown here only grossly schematically and has a driving socket 52, such that the tangential impact wrench 59 is connected to the driving socket 52 in a rotationally fixed connection. The driving socket 52 is in turn releasably connected to the anchor bolt 20 in a form-fitting and rotationally fixed manner by means of the turn handle 25. The driving socket 52 comprises a polygonal socket, which corresponds to the shape of the turn handle 25 for the form-fitting, rotationally fixed connection between the driving socket 52 and the anchor bolt 20.

The setting tool 50 also has a tightening socket 54. The tightening socket 54 is releasably connected in a form-fitting and rotationally fixed manner to the nut 41. For the form-fitting and rotationally fixed connection between the tightening socket 54 and the nut 41, the tightening socket 54 comprises a polygonal socket, which corresponds to the shape of the nut 41.

The driving socket 52 is disposed coaxially in the interior of the tightening socket 54 and is axially displaceable relative to the tightening socket 54. If needed, the internal driving socket 52 may be connected to the tightening socket 54 in a rotationally fixed manner so that rotation of the tangential impact wrench 59 can be transferred to the exterior tightening socket 54 by way of the driving socket 52. The setting tool 50 therefore has a shiftable coupling 56 between the driving socket 52 and the tightening socket 54 which is only shown in grossly schematic terms.

To set an expansion anchor 1 in a structural body, first a borehole is drilled in the structural body, preferably using a heavy-duty hammer drill. The expansion anchor 1 is then driven into the borehole while rotating by operating the tangential impact wrench 59. To do so, the anchor bolt 20 is inserted into the driving socket 52 with the rear turn handle 25 which is in turn set in rotation by the tangential impact wrench 59. While doing so, the tightening socket 54 is connected in a rotationally fixed manner to the driving socket 52 and thus to the tangential impact wrench 59 by means of the coupling 56 so that the tightening socket 54 rotates the hexagonal nut 41 at the same rotational speed and in the same direction of rotation with which the anchor bolt 20 is driven by the driving socket 52. Due to the identical rotational movements of the two sockets 52, 54, their relative positions and thus the position of the nut 41 relative to the anchor bolt 20 remain constant during the driving operation.

Once the required setting depth of the expansion anchor 1 has been reached, for example, by a stop, the tightening socket 54 is secured. The driving socket 52 and thus the anchor bolt 20 are still moved, however, but now they are being moved in the opposite direction of rotation (preferably counterclockwise). Therefore, the nut 41 moves on the screw thread 40 and can secure a component on the body surrounding the anchor bolt 20 while at the same time expanding the anchor bolt 20 in the body.

The advantage for the user is that the user can set and expand the anchor using a tool. Inasmuch as the two sockets 52 and 54 are designed as a removable attachment on the tangential impact wrench 59, the user can also use this for other activities, for example, for setting a concrete screw.

Regardless of the method described here, additional mechanical systems are also conceivable for setting an expansion anchor 1 according to the invention.

The invention claimed is:

1. An expansion anchor, comprising:
   an expansion sleeve for anchoring on a wall of a borehole; and
   an anchor bolt which is disposed through the expansion sleeve;
   wherein the anchor bolt has an expansion region, wherein the expansion sleeve is expandable by the expansion region, wherein the anchor bolt has a cutting thread, and wherein the cutting thread cuts a screw thread into the wall of the borehole such that the anchor bolt is pulled into the borehole by rotating the cutting thread.

2. The expansion anchor according to claim 1, wherein the anchor bolt has a screw thread and wherein a nut is disposed on the screw thread.

3. The expansion anchor according to claim 2, wherein the cutting thread is spaced an axial distance away from the screw thread and the cutting thread is disposed on an axial side of the expansion sleeve that is opposite from the screw thread.

4. The expansion anchor according to claim 2, wherein the cutting thread has a same direction of rotation as the screw thread.

5. A setting tool in combination with the expansion anchor according to claim 2, comprising:
 a driving socket, wherein the driving socket is connectable in a rotationally fixed manner to the anchor bolt; and
 a tightening socket, wherein the tightening socket is connectable to the nut in a rotationally fixed manner.

6. The setting tool according to claim 5, wherein the driving socket is disposed coaxially with the tightening socket and at least partially in an interior of the tightening socket.

7. The setting tool according to claim 5, further comprising a shiftable coupling, wherein a torque transfer between the driving socket and the tightening socket is shiftable by the shiftable coupling.

8. The setting tool according to claim 5, wherein the driving socket is axially displaceable relative to the tightening socket.

9. The setting tool according to claim 5, further comprising a tangential impact wrench connected to the driving socket and the tightening socket in a rotationally fixed manner.

10. The expansion anchor according to claim 1, wherein the cutting thread is disposed at a tip of the anchor bolt.

11. The expansion anchor according to claim 1, wherein the anchor bolt has a turn handle and wherein a driveshaft is connectable to the turn handle.

12. The expansion anchor according to claim 11, wherein the turn handle has a polygonal head.

13. A method for setting an expansion anchor, wherein the expansion anchor includes:
 an expansion sleeve; and
 an anchor bolt which is disposed through the expansion sleeve;
 wherein the anchor bolt has an expansion region and a cutting thread;
comprising the steps of:
 pulling the anchor bolt forward into a borehole by rotating the cutting thread in a first direction of rotation such that the cutting thread cuts a screw thread into a wall of the borehole by the rotating in the first direction of rotation; and
 after the pulling, moving the anchor bolt backward a distance such that the expansion region is drawn into the expansion sleeve and the expansion sleeve is expanded by the moving.

14. The method according to claim 13, wherein the step of moving includes rotating the anchor bolt in a second direction of rotation, wherein the second direction of rotation is opposite from the first direction of rotation.

* * * * *